(No Model.) 2 Sheets—Sheet 1.
F. W. HUESTIS.
MACHINE FOR MAKING VEHICLE TIRES.
No. 601,834. Patented Apr. 5, 1898.
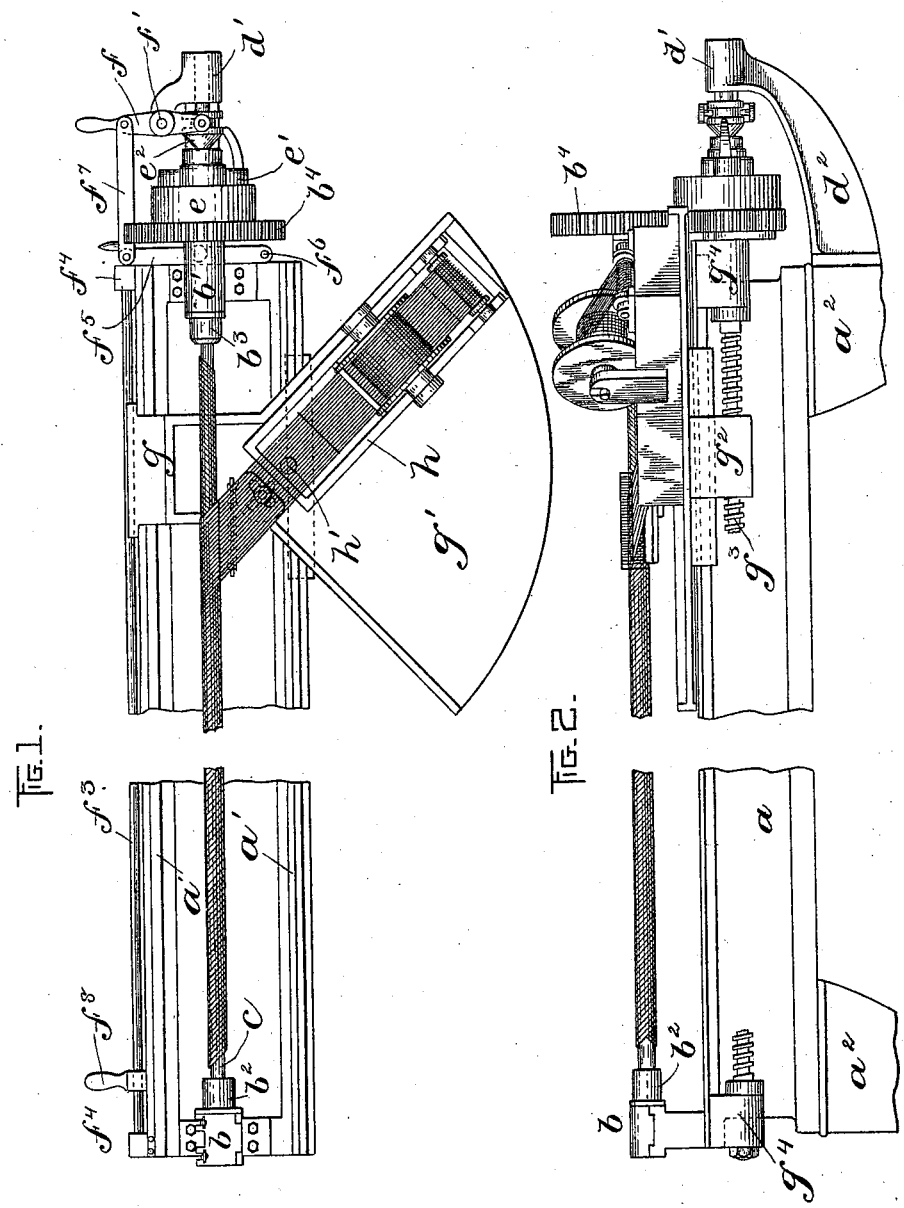
WITNESSES:
A. D. Hanson
P. W. Pezzetti
INVENTOR:
F. W. Huestis
by Wright, Brown & Quinby
Attys (No Model.) 2 Sheets—Sheet 2.
F. W. HUESTIS.
MACHINE FOR MAKING VEHICLE TIRES.
No. 601,834. Patented Apr. 5, 1898.
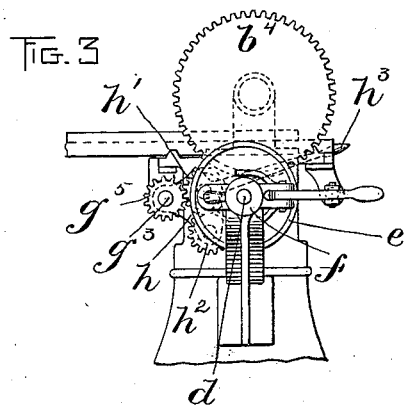
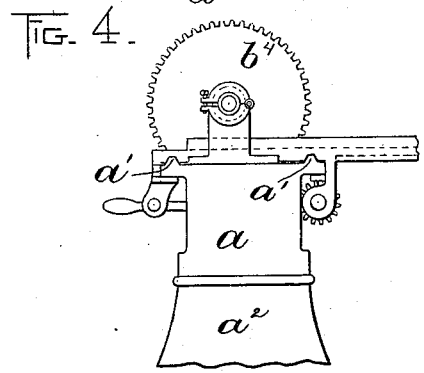
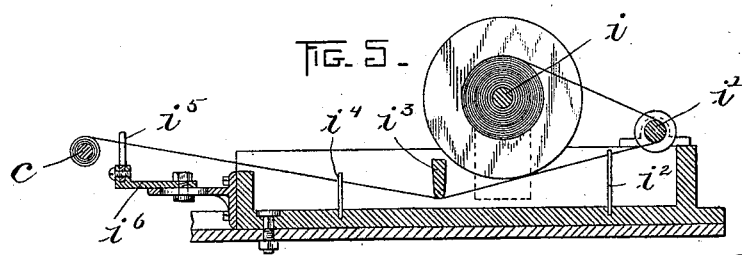
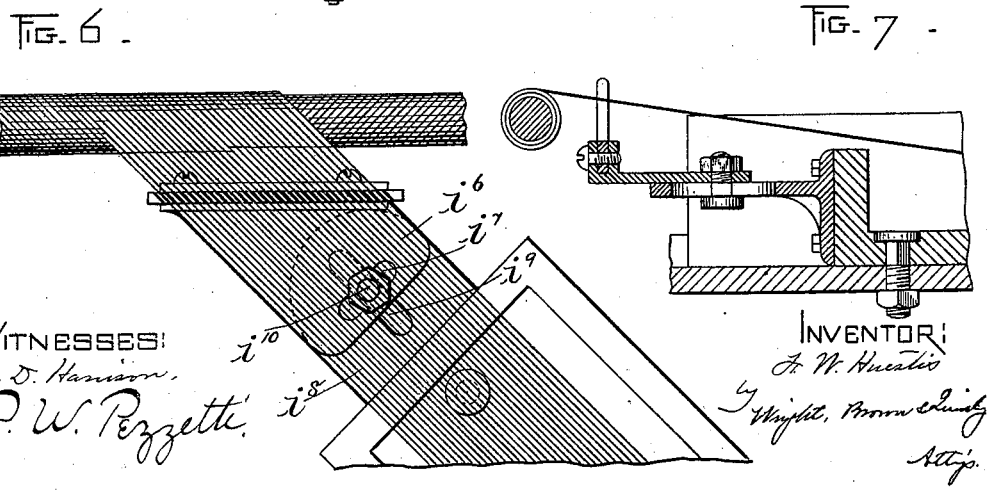
WITNESSES:
A. D. Harrison
P. W. Pezzetti
INVENTOR:
F. W. Huestis
by Wright, Brown & Quinby
Att'ys

UNITED STATES PATENT OFFICE.

FREDERICK WILLIAM HUESTIS, OF BOSTON, MASSACHUSETTS, ASSIGNOR TO THE CONSOLIDATED RUBBER WORKS, OF SAME PLACE.

MACHINE FOR MAKING VEHICLE-TIRES.

SPECIFICATION forming part of Letters Patent No. 601,834, dated April 5, 1898.

Application filed April 30, 1897. Serial No. 634,607. (No model.)

*To all whom it may concern:*

Be it known that I, FREDERICK WILLIAM HUESTIS, of Boston, in the county of Suffolk and State of Massachusetts, have invented certain new and useful Improvements in Machines for Making Vehicle-Tires, of which the following is a specification.

This invention has relation to machines for making tires for vehicles, and particularly those tires which are formed with a layer of threads wound helically and afterward united with the remainder in the tire in one homogeneous mass by vulcanizing.

The object of the invention is to provide such improvements in machines of the class named as to reduce the number of parts thereof by simplifying their construction and also as to increase their efficiency, besides cheapening the cost of their production.

To these ends the invention consists of a machine possessing those features of construction and arrangement of parts, such as illustrated upon the drawings and now to be described in detail, and then pointed out in the claims hereto appended.

Reference is to be had to the accompanying drawings, and to the letters marked thereon, forming a part of this specification, the same letters designating the same parts or features, as the case may be, wherever they occur.

Of the drawings, Figure 1 represents in plan a machine embodying my invention. Fig. 2 represents the same in side elevation. Fig. 3 represents the machine in end elevation with the carriage broken away. Fig. 4 represents the machine looking at it from the other end. Fig. 5 represents a cross-section through the carriage, the mandrel being also shown in cross-section. Figs. 6 and 7 are views of the portion of the carriage and the adjustable comb thereon, together with the mandrel, somewhat enlarged.

In carrying out the invention a bed $a$ is employed, having guides $a'$ $a'$ and supported upon the standards $a^2$, which are shown as broken off in Fig. 2.

Mounted in journals $b$ $b'$ are chucks $b^2$ $b^3$, in which is a removably-mounted cylindrical mandrel $c$. The spindle of the chuck $b^3$, which passes through the bearing $b'$, has secured to it a large gear-wheel $b^4$, by which it is driven so as to revolve the mandrel.

Mounted in bearings is a power-shaft $d$, one of the said bearings $d'$ therefor being provided on the end of a bracket $d^2$. Placed loosely on the said power-shaft is a belt or band pulley $e$, which may be clutched to the shaft by clutch mechanism (indicated conventionally at $e'$) and operated through the medium of a sliding cone-sleeve $e^2$.

Secured rigidly to the shaft is a small pinion (indicated in dotted lines at $f$) which intermeshes with a large gear-wheel $b^4$, so that when the band-wheel $e$ is clutched to the shaft the mandrel $c$ will be rotated through the medium of the pinion $f$ and the gear-wheel $b^4$.

For the purpose of operating the sliding cone-sleeve $e^2$ I provide a hand-lever $f$, fulcrumed at $f'$ on a bracket $d^2$ and having pins $f^2$ entering a groove in the sleeve $e^2$.

For operating the hand-lever $f$ from the other end of the machine a sliding bar $f^3$ is mounted in guides $f^4$ $f^4$ on the bed and is arranged to abut against a lever $f^5$, pivoted at $f^6$, and connected to the hand-lever $f$ by a connecting-rod $f^7$. The handle $f^8$ is secured to the bar $f^3$, so that by moving the said bar $f^3$ longitudinally the hand clutch-lever $f$ may be swung about its pivot and the band-wheel clutched to the shaft.

Mounted to slide upon the guides $a'$ $a'$ of the bed is a carriage $g$, having grooves to receive the said guides and extended laterally in sector shape, as at $g'$, to provide a table to receive a tank or liquid-receptacle $h$, which is pivoted thereto at $h'$. The carriage $g$ is provided with a downwardly-projecting nut $g^2$, through which passes a screw-shaft $g^3$, journaled in bearings $g^4$ $g^4$ at the ends of the machine, and on the end of the screw-shaft $g^3$ is secured a pinion $g^5$. Fulcrumed on the projecting end of the screw-shaft $g^3$ is a plate $h$, upon which are journaled two intermeshing pinions $h'$ and $h^2$, the former of which also intermeshes with the pinion $g^5$. A handle $h^3$ is secured to the plate $h$, so that the latter may be shifted to bring either the pinion $h'$ or the pinion $h^2$ into engagement with the pinion $f$ on the power-shaft $d$. Hence it will be seen that when the pinion $h^2$ is in engagement with the pinion $f$ the screw-shaft will be driven in one direction and when the pinion $h'$ is engaged with the said pinion $f$ the screw-shaft will be driven in the opposite direction, and that therefore the carriage may be moved from either end of the machine to the other.

Mounted upon suitable bearings projecting up from the sides of the tank or receptacle $h$ is a warp-beam $i$, from which the threads are carried in parallelism to the mandrel $c$ and wound thereon.

The threads pass over an idler-roll $i'$, from thence downward through a comb $i^2$, underneath the beam $i$, and under a cross-bar $i^3$, having its ends secured in the side of the receptacle, so as to bring the threads near the bottom of the said receptacle. From the cross-bar $i^3$ the threads pass through a second comb $i^4$ and through an adjustable comb $i^5$ to the mandrel $c$. The combs $i^2$ and $i^4$ are rigidly secured in the bottom of the tank, while the comb $i^5$ is mounted upon the plate $i^6$, having a transverse slot $i^7$ and mounted upon a bracket $i^8$, projecting out from the end of the receptacle and having a longitudinal slot $i^9$. Through the said slots is passed a bolt $i^{10}$, which, being loosened, permits of the comb $i^5$ being adjusted to lie at any angle to the mandrel that may be desirable, so as to vary the width of the warp. When the comb $i^5$ is perpendicular to the warp, the threads will be separated to their greatest extent, and when the angle of the comb to the warp is decreased the threads will be brought more ings 11 travel through the part $a'''$ and drop closely together, as will be readily understood.

In the tank or receptacle is placed a quantity of rubber, cement, or other liquid with which it is desired to saturate the threads.

The operation of the machine is as follows: If the tire to be formed is to be provided with an inner tube and an outer tube with an interposed layer of threads, a rubber tube is first drawn over the mandrel, so as to be free from wrinkles or creases, and the mandrel is placed in the machine. Then the carriage being at the end of the machine farthest from the band-wheel the ends of the thread are cemented to the end of the rubber tube and the band-wheel is clutched to the power-shaft. The rotation of the power-shaft causes the rotation of the mandrel and the rotation of the screw-shaft $q^2$, so that as the threads are wrapped about the mandrel the carriage is advanced at the proper rate of speed to lay the threads evenly and contiguously upon the said mandrel. The threads pass from the beam through the combs, which prevent them from becoming entangled, and as they pass through the rubber cement they are thoroughly coated and saturated with it and are laid upon the mandrel while in that condition. When the carriage has reached the front end of the machine, the threads are cut off and the layer of thread is covered with cement or with a layer of rubber, which is allowed to dry. The mandrel is then removed and placed in another machine, similar to the one which I have just described, and another layer of thread is placed upon it, the carriage being run from the front end of the machine to the rear end, so that the threads of the second layer will lie at an angle to the first layer.

If desired, after the first layer of threads has been placed upon the mandrel the tank may be swung upon its pivot, the comb $i^5$ adjusted, and the carriage moved in the opposite direction to place a second layer of threads upon the mandrel immediately after placing the first layer thereon.

I claim—

1. In a machine of the character described, in combination, a bed, a mandrel thereon, means for rotating the mandrel, a carriage mounted to slide upon the bed, means for sliding the carriage, a warp-beam mounted upon the carriage, and a liquid-receptacle also mounted upon the carriage to move therewith.

2. In a machine of the character described, in combination, a bed having parallel guides, a mandrel, a carriage arranged to slide on the parallel guides of the bed, means for sliding said carriage, a liquid tank or receptacle mounted upon the said carriage, and a warp-beam also mounted upon the carriage, said receptacle and said beam being adjustable relatively to the mandrel.

3. In a machine of the character described, in combination, a bed-frame having parallel guides, a carriage arranged to slide upon said guides, a mandrel mounted upon the said frame, a liquid tank or receptacle mounted upon said carriage, a warp-beam journaled upon said carriage, and means for conducting the threads therefrom through the liquid in the tank to the mandrel.

4. In a machine of the character described, in combination, a bed-frame, a mandrel thereon, a carriage arranged to slide upon the bed-frame, a warp-beam mounted upon the carriage, and adjustable means mounted upon the carriage for varying the width of the warp.

5. In a machine of the character described, in combination, a bed-frame, a mandrel thereon, a carriage arranged to slide upon the bed-frame, a warp-beam mounted upon the carriage, and an adjustable comb mounted upon the carriage for varying the width of the warp.

In testimony whereof I have signed my name to this specification, in the presence of two subscribing witnesses, this 9th day of April, A. D. 1897.

FREDERICK WILLIAM HUESTIS.

Witnesses:
A. D. HARRISON,
P. W. PEZZETTI.